No. 38,073.	PATENTED MAR. 31, 1863.

S. S. WHITE.
ARTIFICIAL TEETH.

Witnesses
Ja Coombs
GW Reed

Inventor
S. S. White
per Munn & Co
Attorneys

UNITED STATES PATENT OFFICE.

SAMUEL S. WHITE, OF PHILADELPHIA, PENNSYLVANIA.

IMPROVEMENT IN ARTIFICIAL TEETH.

Specification forming part of Letters Patent No. 38,073, dated March 31, 1863.

*To all whom it may concern:*

Be it known that I, SAMUEL S. WHITE, of the city of Philadelphia, in the county of Philadelphia and State of Pennsylvania, have invented a new and useful Improvement in Artificial Teeth; and I do hereby declare that the following is a full, clear, and exact description of the same, reference being had to the accompanying drawings forming part of this specification, in which—

Figure 1:
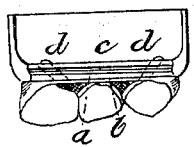
Figure 5:
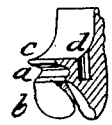
Figure 3:
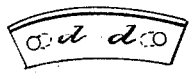
Figure 2:
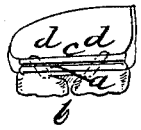
Figure 6:
Figure 4:
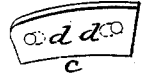

Figures 1 and 2 are inside face views of block teeth constructed according to my invention. Figs. 3 and 4 are base views of the same. Figs. 5 and 6 are transverse vertical sections of the same.

Similar letters of reference indicate corresponding parts in the several figures.

The object of my invention is to obtain a more secure and firm attachment of artificial teeth to a base or setting of vulcanite or other material in which they may be secured in the same manner as to vulcanite; and to this end it consists in the construction of a single tooth or block of two or more teeth with a groove and ridges of peculiar form above the lingual surface, and with holes in the base of the tooth or block converging toward each other, the said groove and holes receiving a portion of the vulcanite or other material of which the base or setting is composed, and one of said ridges entering the said material for the purpose of securing the teeth to the base in a permanent manner.

To enable others skilled in the art to make teeth according to my invention, I will proceed to describe it with reference to the drawings.

The drawings represent the application of the invention to blocks of teeth, Figs. 1, 3, and 5 representing a block of three, and Figs. 2, 4, and 6 a block of two teeth.

$a$ $a$ are the grooves, of V shape, extending across the whole width of the tooth or block at a short distance from the lingual surface, leaving a small ridge, $b$, between it and the lingual surface, and a more prominent ridge, $c$, on the opposite side of the groove, the ridge $b$ serving as a guide by which to finish off the vulcanite, the groove $a$ receiving a portion of the vulcanite, and the more prominent ridge $c$ entering the vulcanite.

$d$ $d$ are the converging holes in the base of the tooth or block, made as deep as is consistent with the strength of the teeth, and converging toward each other, as shown in dotted lines in Figs. 1 and 2. I generally make two of these holes in each block or single tooth, but do not confine myself to that number.

In setting the teeth a portion of the vulcanite, or other substance of which the setting or base is composed, enters the groove $a$, and a portion enters the holes $e$ $e$, while the prominent ridge $c$ is embedded in the said substance. The groove $a$ and ridge $c$ are more especially intended to secure the teeth against any strain in an outward or inward direction, and the converging holes secure them against any tendency to pull them vertically from their setting, in which respect they have a great advantage over vertical and parallel holes in the base.

It will be obvious that the converging holes could be used in connection with some other means of resisting the inward and outward strain, or the groove and ridge in connection with dovetails or other means of resisting a direct vertical pull.

What I claim as my invention, and desire to secure by Letters Patent, is—

1. The combination of the groove $a$ and ridges $b$ $c$, extending the whole width of the block or tooth, the ridge $c$, farthest from the lingual surface, being made more prominent than the ridge $b$, next the lingual surface, substantially as and for the purpose herein specified.

2. The arrangement of the holes $e$ $e$ in the base of the tooth or block, converging toward each other, substantially as and for the purpose herein described.

SAMUEL S. WHITE.

Witnesses:
SAMUEL T. JONES,
W. S. HAGABY.